Figure 1:
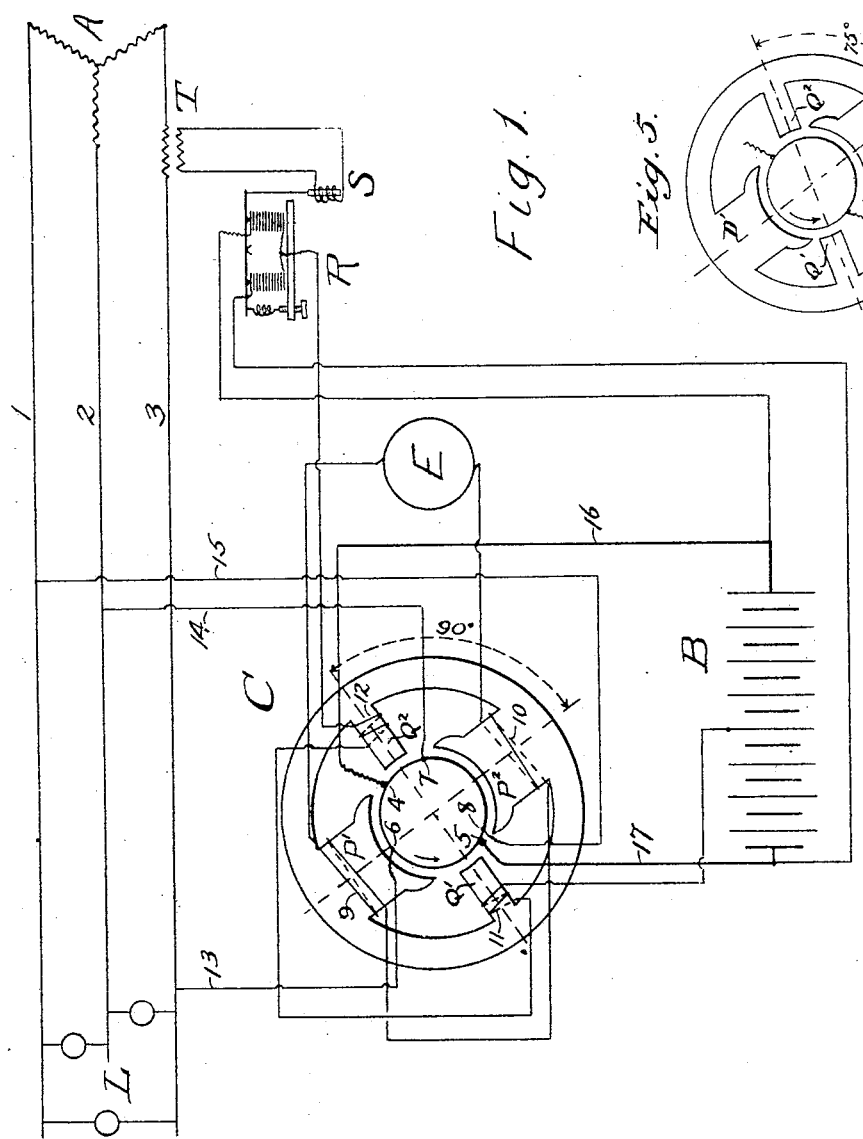

J. L. WOODBRIDGE.
VARIABLE RATIO ROTARY CONVERTER.
APPLICATION FILED FEB. 17, 1908.
949,251.
Patented Feb. 15, 1910.
2 SHEETS—SHEET 2.
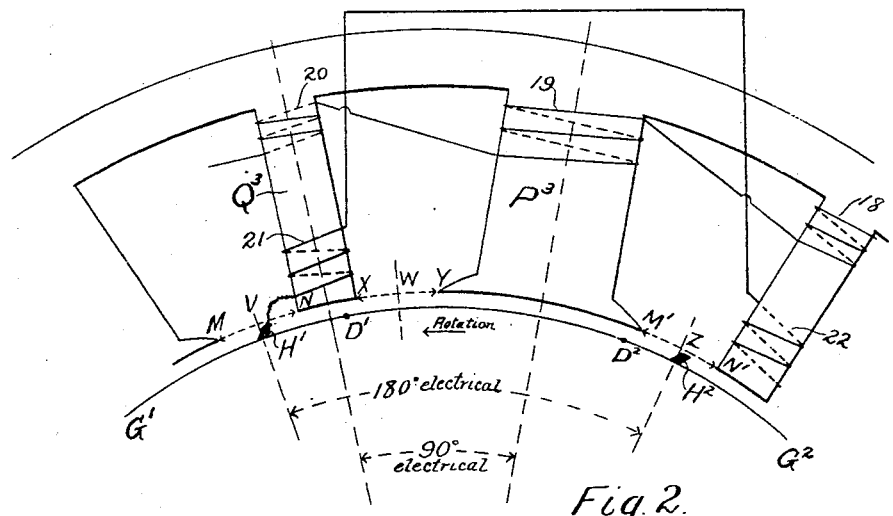
Fig. 2.
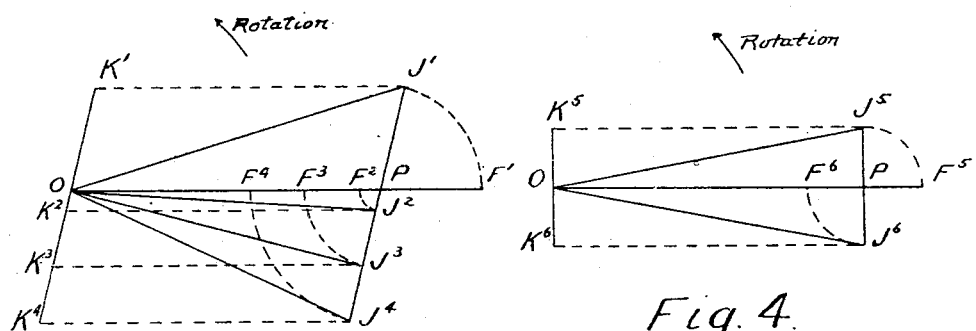
Fig. 3.
Fig. 4.
WITNESSES
INVENTOR.
Joseph L. Woodbridge.
BY
ATTORNEY.

UNITED STATES PATENT OFFICE.

JOSEPH LESTER WOODBRIDGE, OF PHILADELPHIA, PENNSYLVANIA.

VARIABLE-RATIO ROTARY CONVERTER.

949,251.  Specification of Letters Patent.  Patented Feb. 15, 1910.

Application filed February 17, 1908. Serial No. 416,270.

*To all whom it may concern:*

Be it known that I, JOSEPH LESTER WOODBRIDGE, a citizen of the United States, and resident of Philadelphia, in the county of Philadelphia and State of Pennsylvania, have invented certain new and useful Improvements in Variable-Ratio Rotary Converters, of which the following is a specification.

My invention relates to those systems in which a rotary converter of the general type described in Letters Patent #679,812, and #679,813, issued to me under date of August 6th, 1901, and Letters Patent #873,714, issued to Jos. L. Burnham under date of December 17th, 1907, designed for a variable ratio between the alternating current and direct current voltage is used for automatic transfer of energy between an alternating current and a direct current circuit.

My invention may also be applied to the construction of a rotary converter designed for automatically increasing the direct current voltage with increase of direct current output from the rotary with constant applied alternating current voltage.

One of the principal objects of my invention is to reduce to a minimum the disturbance to the power factor on the alternating current circuit when a machine of this type is used, with automatic control of the voltage ratio.

The general nature and scope of my invention will be more clearly seen by reference to the following description in connection with the accompanying drawings, in which—

Figure 1, shows a system of distribution in which a rotary converter involving features of the invention is shown. Fig. 2, illustrates the details of construction of a rotary converter of similar design to that shown in Fig. 1, but of a multi-polar type. Figs. 3, and 4, are vector diagrams to which reference will be made in explaining the operation of the rotary converters shown in Figs. 1 and 2, and Fig. 5, shows the construction corresponding to the vector diagram Fig. 3, in which the auxiliary poles are spaced less than 90° from the main poles.

Referring to Fig. 1, A, is a source of alternating current supplying the three phase circuit 1, 2, and 3, to which are connected translating devices L, constituting a variable load. B, is a storage battery. C, is a rotary converter of special design whose alternating current terminals 6, 7, and 8, are connected to the alternating current circuit by the conductors 13, 14, and 15, and whose direct current brushes 4, and 5, are connected to the battery terminals by conductors 16 and 17. The converter C, is of the bi-polar type, but each pole is divided into two sections, the larger sections $P^1$ and $P^2$ being the principal sections and the smaller ones $Q^1$ and $Q^2$, being the auxiliary sections. The principal sections $P^1$ and $P^2$ are provided with a constant excitation by means of the field windings 9 and 10 connected to the constant potential exciter E. The auxiliary pole sections $Q^1$ and $Q^2$ are provided with field windings 11 and 12, connected between the carbon regulator R and the middle point of the storage battery B, the other two terminals of the carbon regulator being connected to the outer terminals of the battery. The solenoid S of the carbon regulator is energized by current from the secondary winding of a series transformer T, whose primary winding is connected in series with conductor 3, of the alternating current circuit. The operation of this carbon regulator is well known and need not be further described herein except to state that its action in this case is to transmit a variable current in either direction through the field windings 11 and 12, in response to small fluctuations of load on the alternating current circuit. This varying current in the windings 11 and 12 produces a variation in the direct current voltage of the converter C without materially altering its alternating current voltage except as to its phase relation, thereby causing the battery to charge and discharge through the converter from and into the alternating current circuit to relieve the source A of fluctuations of load at L. The special feature in the design of the converter C as here shown lies in the fact that the center lines of the principal and auxiliary pole sections are spaced 90 electrical degrees apart. The object of this special feature as well as the general method of operation of the converter will now be more clearly set forth in connection with Figs. 2, 3, and 4.

In Fig. 2, the line $G^1$—$G^2$, represents the periphery of the armature of a rotary converter of a multi-polar type, the direct current brushes being located at $H^1$ and $H^2$ and three phase alternating current taps being taken from the armature winding at points 120 electrical degrees apart, as for example, D¹ and D². The principal pole section is shown at P³, and the corresponding auxiliary section at Q³. As shown, the center lines of these two sections are spaced 90 electrical degrees apart. This is accomplished by leaving a space XY between the tips of the pole sections P³ and Q³ equal to the space MN and M¹, N¹. If the pole faces of P³ and Q³ constituted one continuous face from the point V to the point Z immediately over the direct current brushes with no space between the tips X and Y, the center lines between these sections would necessarily be 90° apart, since these faces would cover a total of 180°. But a considerable space Mn and M¹ N¹ must be left between the pole tips on either side of the direct current brushes for purposes of commutation, and in order to maintain the 90° spacing of the pole sections above referred to it is necessary to leave a space XY between the tips of the pole sections equal to the space MN and M¹ N¹.

To explain the reason for this construction and the general operation of this machine, we may consider separately the alternating current electro-motive-forces developed by the pole sections P³ and Q³. Referring to Fig. 3, the electro-motive-force developed by the principal section P³ may be represented in amount and phase relation by the vector OP. The alternating current electro-motive-force developed by the auxiliary pole section Q³ would be represented by a second vector displaced from the first by the angular displacement between the two pole sections. If this displacement were less than 90° as illustrated in Fig. 5, this second vector would be represented by the line OK¹, provided the pole Q³ is excited of the same polarity as P³. The resultant alternating current electro-motive-force will be represented by the line OJ¹ and it will be noted that the line OJ¹ is appreciably greater than the line OP. If the excitation of the pole section Q³ is zero, the resultant alternating current electro-motive-force will be represented by the original line OP. If now the excitation of the auxiliary pole Q³ be reversed and be given various values represented by the lines OK² OK³ and OK⁴, the resultant alternating current electro-motive-forces will be represented by the lines OJ² OJ³ and OJ⁴. The length of the line OK³ was chosen so that the resultant OJ³ is at right angles to OK³. If the distance K² K³ is the same as K³ K⁴, that is, if the excitation corresponding with OK² is as much less than OK³ as OK⁴ is greater than OK³, the corresponding resultants OJ² and OJ⁴, will be equal and but very slightly greater than OJ³. It will be seen from this diagram that in order to reduce the variation of the alternating current electro-motive-force to a minimum with a given change in the excitation of the auxiliary pole Q³, this excitation should have a mean value OK³ which will produce a resultant OJ³ at right angles to OK³, the excitation being varied equally on each side of this mean value to give the desired range of direct current voltage. The direct current voltage will vary with the total field flux between the direct current brushes H¹ and H² (see Fig. 2) and will therefore vary with the algebraic sum of the field flux in P³ and Q³. The direct current voltages corresponding with the excitation K¹, K², K³ and K⁴ may therefore be represented by the lines OF¹, OF², OF³ and OF⁴, respectively.

To produce conditions of minimum change in alternating current voltage as shown in Fig. 3, it would be necessary to provide a mean excitation for the auxiliary pole section Q³ corresponding with the line OK³ of a polarity opposite to that of the principal pole P³, and then to provide means for varying this excitation on either side of this mean value. I have included such a combination of apparatus in Patent No. 897,950, issued to me September 8th, 1908. It will be seen, however, that this mean negative excitation on the pole section Q³ is required only when the center lines of the principal and auxiliary pole sections are displaced by an angle less than 90°. If this angle is exactly 90° the conditions may be represented by the vector diagram shown in Fig. 4. In this diagram, as in Fig. 3, OP represents the alternating current voltage due to the principal pole section P³. OK⁵, represents the alternating current voltage due to the auxiliary pole section Q³, when excited of the same polarity as P³. The resultant alternating current voltage is represented by OJ⁵, and the corresponding direct current voltage by OF⁵. If the pole section Q³ is excited of the opposite polarity, the line OK⁶ would represent the corresponding alternating current voltage due to this section and the line OJ⁶ the resultant alternating current voltage, while the line OF⁶ would represent the corresponding direct current voltage. From this diagram it will be seen that the mean excitation of the auxiliary pole section Q³ for minimum change in alternating current voltage is zero, and in order to produce the desired results in automatic control of the direct current voltage with minimum disturbance of the alternating current power factor, it is only necessary to provide for an excitation of pole section Q³ varying on either side of zero. This arrangement results in certain economy of materials in the construction of the converter, inasmuch as at the time of maximum direct current voltage both pole sections are excited of the same polarity and the iron in these pole sections may therefore be used to its full capacity, whereas, with an arrangement corresponding with Fig. 3, designed to produce minimum disturbance of the alternating current power factor, the iron in pole section $Q^3$ at the time of maximum direct current voltage is carrying very little magnetic flux as compared with its maximum excitation, which occurs at the time of minimum direct current voltage. This arrangement, therefore, requires either more iron or more field copper or both, as compared with an arrangement corresponding with Fig. 4.

In Fig. 1, are shown means for variably exciting the pole sections $Q^1$ and $Q^2$ in response to changes on the alternating current circuit. In Fig. 2, I have shown this varying excitation produced by means of a field winding 21 and 22, in series with the direct current output of the machine. This latter arrangement may be used for automatically compounding or over compounding the machine at its direct current terminals for variations in direct current output with practically constant alternating current voltage applied. With this arrangement the minimum direct current voltage, corresponding with the resultant $OJ^6$, in Fig. 4, would occur when the direct current output of the machine was zero, and there would be no current in the field winding 21, 22. To produce the negative excitation in the auxiliary pole sections corresponding with $OK^6$, Fig. 4, a second field winding, 18 and 20, is shown on these sections, connected in series with the main field winding 19, on the principal pole sections, this excitation being constant.

The designs and arrangements of apparatus described above are particularly useful when automatic control of the direct current voltage of a rotary converter is desired with constant applied alternating current voltage, as they disclose means for effecting such control with minimum change in the alternating current counter-electromotive-force of the rotary by varying the magnetism in the auxiliary pole section only. Where manual adjustment is sufficient the excitation of the principle pole sections may be varied to correct any disturbance due to changes in the auxiliary sections. But such corrective adjustment of the principal sections to give constant alternating current electro-motive-force, will not be at all proportional to the change in the auxiliary poles, and could not therefore be effected by the same automatic controlling means. By eliminating the necessity for such adjustment of the principal pole sections in the manner described herein, the automatic control is much simplified.

What I claim is:

1. In combination an armature provided with alternating current terminals and a commutator and appropriate direct current brushes, means for producing in the armature between the contact points of adjacent direct current brushes a magnetic flux adapted to develop a primary alternating current electro-motive-force, means for producing between the same contact points a second automatically varying magnetic flux adapted to develop a secondary alternating current electro-motive-force displaced from the first and such that at its mean value it will with the primary electro-motive-force produce a resultant displaced substantially 90 electrical degrees from the line of the secondary electro-motive-force.

2. In combination an armature provided with alternating current terminals and a commutator and appropriate direct current brushes, means for producing in the armature between the contact points of adjacent direct current brushes a magnetic flux adapted to develop a primary alternating current electro-motive-force, means for producing between the same contact points a second magnetic flux adapted to develop a secondary alternating current electro-motive-force displaced substantially 90 electrical degrees from the primary electro-motive-force, and means for varying the value of the second flux on either side of zero.

3. In combination an armature provided with alternating current terminals and a commutator and appropriate direct current brushes, a field structure for the armature providing for the magnetic flux which influences the armature between adjacent direct current brushes, two paths whose center lines are displaced at the armature face substantially 90 electrical degrees, means for applying a constant field excitation to one of said paths, and means for applying a varying and reversing excitation to the other.

4. In combination an armature provided with alternating current terminals and a commutator and appropriate direct current brushes, a field structure for the armature providing for the magnetic flux which influences the armature between adjacent direct current brushes, two paths whose center lines are displaced at the armature face substantially 90 electrical degrees, means for applying a constant field excitation to one of said paths, and automatic means for applying a varying and reversing excitation to the other.

5. In combination an alternating current circuit, a direct current circuit, an armature provided with alternating current terminals, commutator and direct current brushes operatively connected between them, means for developing in the armature between the contact points of adjacent direct current brushes a primary alternating current electro-motive-force, and means responsive to the electrical condition of the alternating current circuit for developing in the armature between the same contact points an automatically varying secondary alternating current electro-motive-force displaced from the first and such that at its mean value it will with the primary electro-motive-force produce a resultant displaced 90 electrical degrees from the line of said secondary electro-motive-force.

6. In combination an armature provided with alternating current terminals, commutator and direct current brushes, means for developing in said armature between the contact points of adjacent direct current brushes two component alternating current electro-motive-forces a primary and a secondary, whose resultant at a critical value of the secondary is displaced 90 electrical degrees from the line of the secondary and electro-responsive means for varying the secondary on either side of said critical value.

7. In combination an armature provided with alternating current terminals, commutator and direct current brushes, means for producing in said armature between the contact points of adjacent direct current brushes two magnetic fluxes adapted to develop two component alternating current electro-motive-forces, a primary and a secondary, whose resultant at a critical value of the secondary flux is displaced 90 electrical degrees from the secondary electro-motive-force, and electro-responsive means for varying the last named flux on either side of the critical value.

8. In combination an alternating current circuit, a direct current circuit, an armature provided with alternating current terminals, commutator and direct current brushes, said armature operatively connected between said circuits, means for producing in the armature between the contact points of adjacent direct current brushes a primary magnetic flux and means responsive to changes of electrical condition on the alternating current circuit for producing between the same contact points a varying and reversing secondary flux whose axis at the armature face is displaced substantially 90 electrical degrees from that of the primary flux, whereby the transfer of energy between the circuits is controlled responsively to said changes on the alternating current circuit.

9. In combination an alternating current circuit, a storage battery, an armature provided with alternating current terminals, commutator and direct current brushes, said armature operatively connected between the alternating current circuit and the battery, means for producing in the armature between the contact points of adjacent direct current brushes a primary magnetic flux, and means responsive to changes of electrical condition on the alternating current circuit for producing between the same contact points a varying and reversing secondary flux whose axis at the armature face is displaced substantially 90 electrical degrees from that of the primary flux, whereby the direct current voltage at the brushes is varied to cause the battery to charge and discharge through the armature from and to the alternating current circuit to compensate for load fluctuations with minimum disturbance to the power factor on said circuit.

In testimony whereof I have hereunto signed my name.

JOSEPH LESTER WOODBRIDGE.

Witnesses:
W. J. JACKSON,
FRANK E. FRENCH.